United States Patent [19]

Gilhooley

[11] 4,229,727
[45] Oct. 21, 1980

[54] VEHICLE SPEED ALARM

[76] Inventor: Robert Gilhooley, 1311 Lincoln Ave. South, Highland Park, Ill. 60035

[21] Appl. No.: 32,532

[22] Filed: Apr. 23, 1979

[51] Int. Cl.³ .............................................. B60Q 1/54
[52] U.S. Cl. .................................... 340/53; 340/670; 180/171; 455/68
[58] Field of Search .......................... 340/53, 62, 670; 180/170, 171, 172; 455/68

[56] References Cited

U.S. PATENT DOCUMENTS

| | | | |
|---|---|---|---|
| 3,195,671 | 7/1965 | Wolfe, Sr. | 340/53 |
| 3,656,099 | 4/1972 | Campbell | 340/62 |

*Primary Examiner*—Alvin H. Waring

*Attorney, Agent, or Firm*—Hume, Clement, Brinks, Willian & Olds, Ltd.

[57] ABSTRACT

A vehicle speed alarm is used to alert a driver of a vehicle that the instantaneous speed thereof has exceeded a pre-established maximum vehicular speed. The speed alarm produces a reference signal upon receipt of a transmitted signal containing information corresponding to the pre-established maximum vehicle speed. This reference signal is compared with a speed signal which corresponds to the instantaneous speed of the vehicle. When the instantaneous speed of the vehicle exceeds the pre-established maximum speed, a control signal is developed to alert the driver of that condition.

2 Claims, 3 Drawing Figures

VEHICLE SPEED ALARM

BACKGROUND OF THE INVENTION

It is well known that highway accidents are a significant cause of accidental deaths, and that a substantial cause of such accidents is excessive vehicular speed. In the past many devices have been proposed for keeping vehicular speed within posted limits. One such device comprised a manually adjustable indicator connected to the dashboard speedometer. This indicator could be pre-set by the driver for any desired speed. In accordance with one aspect of its intended use, the driver would set the indicator to the speed limit posted on the highway on which he is driving. If the speed of his vehicle exceeded the pre-set speed, a buzzer would sound alerting the driver to the fact that his vehicular speed was excessive.

Though manually adjustable indicators of the type described met with some success, they also suffered from certain drawbacks. One such drawback was that the driver would repeatedly have to adjust the indicator each time he travelled on a highway with a different speed limit in order for the device to be constantly effective. Many drivers found the need to repeatedly reset the device extremely inconvenient, and after a while some simply pre-set the indicator to the highest posted speed, thereby rendering the device ineffectual for a substantial amount of travel. Other drivers, when the need arose, simply pre-set the indicator at or near the maximum indicated on their dashboard speedometer, thereby rendering the device virtually useless as a vehicle speed alarm.

It is an object of the present invention to provide an improved vehicle speed alarm which does not suffer from the foregoing drawbacks. It is a further object of the invention to provide an improved vehicle speed alarm which does not have to be pre-set for each posted speed limit, and which can not readily be rendered useless by the driver as was the case with prior art devices of the type hereinbefore described.

SUMMARY OF THE INVENTION

In accordance with the foregoing objects, the present invention relates to a vehicle speed alarm which preferably includes a receiver, disposed in the vehicle, adapted to receive a transmitted signal originating outside the vehicle. The transmitted signal contains information corresponding to a pre-established vehicular speed which may desirably be the posted speed limit on the particular highway travelled. The transmitted signal can be sent in many ways. Police cars, for example, can transmit the necessary signal as they are travelling down the highway, micro-transmitters disposed along the right-of-way can be employed. Signals may be reflected from devices located along the roadway, and so forth.

The improved vehicular speed alarm further includes means for producing a speed signal preferably corresponding to the instantaneous speed of the vehicle. Signals corresponding to the instantaneous vehicular speed, and the pre-established vehicular speed are then electronically compared, and when the former exceeds the latter a control signal is developed. This control signal may actuate an alarm inside the vehicle to alert the driver that the speed of his vehicle is excessive, it may be used to actuate a governor in the vehicle to reduce vehicular speed automatically, or it may serve some other purpose.

DESCRIPTION OF THE DRAWINGS

The various objects, features and advantges of the invention summarized above can be test understood by reading the following detailed description in conjunction with the accompanying drawings in which.

DETAILED DESCRIPTION OF AN EXEMPLARY EMBODIMENT

Figure 1:
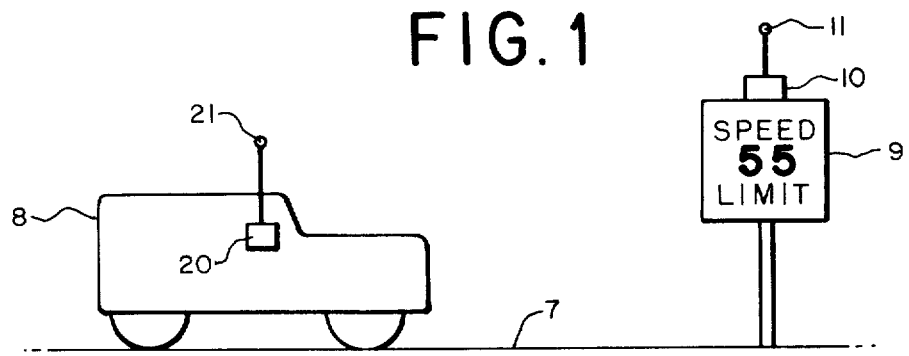
FIG. 1 is a schematic view of certain aspects of an exemplary embodiment of the invention.

Referring now to FIG. 1, there is illustrated a vehicle, such as an automobile 8, travelling along a highway 7 at a particular instantaneous speed. As used herein the "instantaneous speed" of automobile 8 is not necessarily intended to be used in an absolute sense, but can be applied to vehicle speed integrated or averaged over a reasonable period of time, or to any other method or means of reasonably approximating vehicle speed. Automobile 8 travelling along highway 7 carries a vehicle speed alarm including a receiver 20 and an antenna 21, all as more fully explained hereinafter.

Disposed along the right-of-way of highway 7 are ubiquitous speed limit signs 9. In accordance with one aspect of this invention, signs 9 are adapted to carry a transmitter 10 having an antenna 11. Transmitter 10 is arranged to generate a particular signal, such as a radio frequency carrier modulated by an information component such as a "tone" or the like. If a "tone" is to serve as the information component of the particular signal, it will preferably be of a frequency which corresponds to the pre-established maximum vehicle speed for highway 7. Thus in the example illustrated in FIG. 1 the "tone" frequency may correspond to a speed of 55 MPH, or perhaps a value somewhat higher to permit some tolerable margin above the posted speed limit. The particular signal generated by transmitter 10 is radiated by antenna 11, received at antenna 21 of automobile 8 as it approaches sign 9, and is then passed to receiver 20. Of course, transmitter 10 may take numerous other forms including means for reflecting a signal developed elsewhere, including inside automobile 8, such reflected signal being understood to be a transmitted signal originating outside automobile 8.

Figure 2:
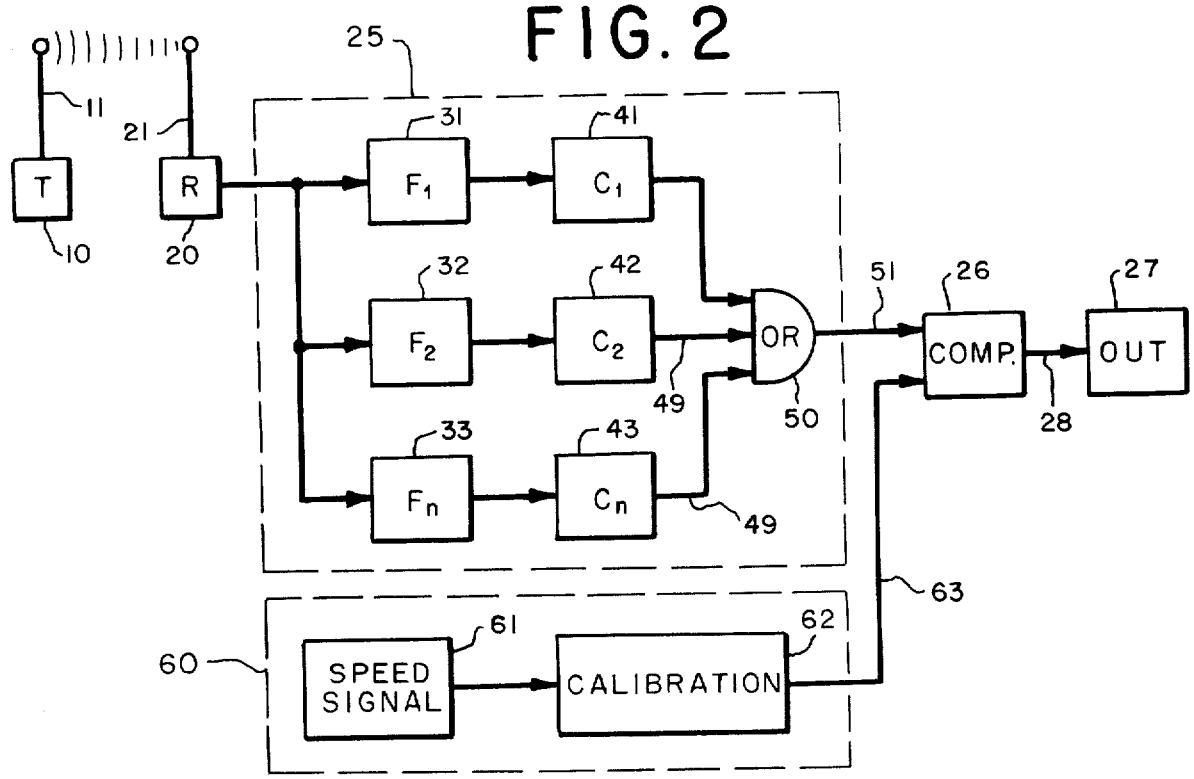
FIG. 2 is a detailed block diagram of the components of an exemplary embodiment of the invention, certain aspects of which having been illustrated schematically in FIG. 1.

Receiver 20 preferably comprises a conventional superheterodyne radio receiver for demodulating the particular signal generated by transmitter 10, and recovering the information component which, in this example, is a "tone" having a frequency corresponding to the pre-established maximum vehicular speed for highway 7. As shown in FIG. 2, receiver 20 is coupled to means 25 which include a plurality of filters 31, 32 and 33. Each of filters 31, 32 and 33 is electrically tuned to a predetermined frequency, one of which corresponds to the frequency of the "tone" recovered by receiver 20. Thus, in accordance with well known electrical principles, filters 31, 32 and 33 produce an electrical signal at their outputs only upon receipt of a signal having a frequency corrresponding to the frequency to which they are tuned.

By utilizing a plurality of filters in means 25, the subject vehicle speed alarm can be made to respond to any reasonable number of maximum speeds that may be established for different streets and roads. For example, filter 31 may be tuned to a frequency corresponding to a "tone" indicating a pre-established speed of about 55 MPH as posted on interstate highways, filter 32 may be tuned to a frequency corresponding to a "tone" indicating a pre-established speed of about 45 MPH as posted on certain country roads, and filter 33 may be tuned to a frequency corresponding to a "tone" indicating a pre-established speed of about 30 MPH as posted on many city streets. Of course, it is contemplated that the transmitters, such as transmitter 10, disposed along these various streets and roads would generate "tones" having frequencies corresponding to the frequencies to which these filters are tuned.

Figure 3:
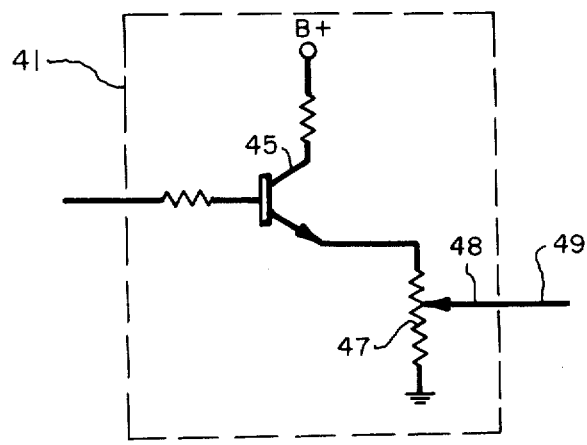
FIG. 3 is a simplified circuit diagram which exemplifies one of the components shown in the block form in FIG. 2.

Each of filters 31, 32 and 33 are coupled respectively to a plurality of convertors 41, 42 and 43. In this exemplary embodiment, convertors 41, 42 and 43 serve to produce an electrical signal of pre-determined strength only upon receipt of an electrical signal from the output of the particular filter to which they are coupled. One way of accomplishing this result is shown in the simplified circuit of FIG. 3. In particular, FIG. 3 illustrates a simplification of one convertor 41, having a normally non-conducting transistor 45. The emitter of transistor 45 is coupled to a variable resistor 47 having a tap 48. When a corresponding filter 31 passes an electrical signal to convertor 41, transistor 45 conducts, causing current to flow from B+, through resistor 47, to ground. By adjusting tap 48, an electrical signal of pre-determined strength will appear at conductor 49 which represents the output of convertor 41.

Referring again to FIG. 2, convertors 41, 42 and 43 are coupled to separate inputs of an OR gate 50 via conductors 49. In accordance with conventional OR gate operation, an electrical signal, (hereinafter referred to as a reference signal), is produced at the output 51 of OR gate 50 if the electrical signal of pre-determined strength appears at any of the conductors 49 emerging from convertors 41, 42 or 43. The reference signal produced at the output 51 of OR gate 50 is then passed to one input of a conventional signal comparator represented by block 26.

Signal comparator 26 has a second input which receives a speed signal via a conductor 63. The speed signal is generated by means 60 which may include a conventional speed signal generator 61 for producing an electrical signal corresponding to the instantaneous speed of automobile 7, and a calibration device 62 whose purpose is to ensure that the level of the signal produced by speed signal generator 61 is compatible for comparision purposes, with the reference signal appearing at conductor 51.

In accordance with well known electrical operation, comparator 26 is adapted to produce an output, hereafter referred to as a control signal, only when the speed signal applied from conductor 63 exceeds the reference signal applied from conductor 51, thereby indicating that the instantaneous speed of automobile 8 has exceeded the pre-established maximum vehicular speed for highway 7. This control signal is then applied, via a conductor 28, to an output 27. Output 27 may take the form of an alarm, which may alert the driver of automobile 8 that he is "speeding" by means of a buzzer, flashing lamp, etc. Alternatively, output 27 may serve as a governor, which reduces the speed of automobile 8 automatically.

In view of the foregoing, the operation of the subject vehicle speed alarm can be readily explained. A number of transmitters, such as transmitter 10, are disposed along the right-of-way of a street or road. These transmitters are adapted to generate a signal containing information corresponding to the pre-established maximum vehicular speed for the particular street or road on which they are located. Similarly, each speed alarm carried by a vehicle is adjusted, by means such as filters 31, 32 and 33, to respond to the pre-established maximum vehicular speed signals generated by the transmitter 10. This response has the effect of producing a reference signal which is electrically compared with a speed signal corresponding to the instantaneous speed of the vehicle. When the latter exceeds the former, an output is actuated to assist in reducing the speed of the vehicle.

In actual operation, one skilled in the art may find it desirable to add anti-falsing circuitry, buffer amplifiers, impedance matching means, or the like, to the vehicle speed alarm herein disclosed. It is also contemplated that numerous modifications, variations and changes which do not depart from the true scope of the invention will be apparent to those skilled in the art. All such modifications, variations and changes are intended to be covered by the following claims.

I claim:

1. A vehicle speed alarm for use in a vehicle comprising:
   receiver means for receiving any of a plurality of transmitted signals originating outside said vehicle, each of said transmitted signals containing individualized frequency information corresponding to a different pre-established maximum vehicular speed;
   a plurality of filter means, each being tuned to a different frequency, for producing a filtered signal upon receipt of a transmitted signal having frequency information corresponding to the frequency to which said filter means are tuned;
   convertor means, coupled to said plurality of filter means for producing a predetermined strength signal upon receipt of said filtered signal;
   OR gate means coupled to said convertor means, for producing a reference signal upon receipt of any predetermined strength signal from said convertor means;
   generator means for producing a signal corresponding to the instantaneous speed of said vehicle;
   calibration means, coupled to said generator means, for producing a speed signal compatible, for comparison purposes, with said reference signal; and
   comparator means having a first input coupled to said OR gate means for receiving said reference signal, and a second input coupled to said calibration means for receiving said speed signal; said comparator producing a control signal only when said speed signal exceeds said reference signal, whereby the presence of said control signal indicates that the instantaneous speed of said vehicle exceeds said pre-established maximum vehicular speed.

2. The vehicle speed alarm defined in claim 1 further includes alarm means, coupled to said comparator means, for producing sensory information upon receipt of said control signal.

* * * * *